(12) United States Patent
Van Houtum

(10) Patent No.: US 7,392,031 B2
(45) Date of Patent: Jun. 24, 2008

(54) METHOD FOR CANCELLING A NARROW-BAND INTERFERENCE SIGNAL

(75) Inventor: Wilhelmus Johannes Van Houtum, Eindhoven (NL)

(73) Assignee: NXP B.V., Eindhoven (NL)

( * ) Notice: Subject to any disclaimer, the term of this patent is extended or adjusted under 35 U.S.C. 154(b) by 104 days.

(21) Appl. No.: 10/561,459

(22) PCT Filed: Jun. 21, 2004

(86) PCT No.: PCT/IB2004/050948

§ 371 (c)(1),
(2), (4) Date: Dec. 20, 2005

(87) PCT Pub. No.: WO2004/114538

PCT Pub. Date: Dec. 29, 2004

(65) Prior Publication Data

US 2007/0105520 A1 May 10, 2007

(30) Foreign Application Priority Data

Jun. 25, 2003 (EP) ................................. 03101859

(51) Int. Cl.
*H04B 1/10* (2006.01)

(52) U.S. Cl. ................ 455/304; 455/295; 455/296; 375/346

(58) Field of Classification Search ................ 455/295, 455/296, 302, 304, 305; 375/346, 348, 349
See application file for complete search history.

(56) References Cited

U.S. PATENT DOCUMENTS 6,128,494 A * 10/2000 Rozmaryn ............... 455/436
6,683,913 B1 * 1/2004 Kantschuk ............... 375/258

* cited by examiner

*Primary Examiner*—Edward Urban
*Assistant Examiner*—Christian A Hannon
(74) *Attorney, Agent, or Firm*—Peter Zawilski

(57) ABSTRACT

A method of canceling a narrow-band interference signal in a receiver is provided. A reference signal (ref_in) is subtracted from a received input signal (in). the phase of a result of the subtraction is calculated on the basis of an arctangent function. An unwrap function on the output signal from the arctangent function is performed by removing the modulo 2Π limitation introduced with the arctangent function, in order to produce an absolute phase representation. A frequency offset is determined by comparing phase representation values which are shifted predetermined in time. The narrow-band interference signal is canceled based on the result of the determined frequency offset.

8 Claims, 8 Drawing Sheets

METHOD FOR CANCELLING A NARROW-BAND INTERFERENCE SIGNAL

This invention relates in general to the field of radio communications and more specifically to interference cancellation/suppression of a narrow band interferer in a wide band communication device.

Wireless computing has experienced an enormous growth since it allows users to access network services without being bounded to a wired infrastructure. Due to the rapid growth of wireless networks in recent years, problems with different networks interfering with each other have risen. These problems become significant when networks occupy the same frequency band, causing them to interfere with each other. The two wireless systems that have experienced the most rapid evolution and wide popularity are the standard developed by IEEE for wireless local area networks (WLANs), identified as IEEE 802.11, and the Bluetooth technology or the IEEE 802.15.1. Both these systems operate in the 2.4 GHz Industrial, Scientific, and Medical (ISM) band (i.e., 2.400-2.4835 GHz). IEEE 802.11 WLANs are designed to cover areas as vast as offices or buildings. The fundamental building block of the network is the so-called Basic Service Set (BSS), which is composed of several wireless stations and one fixed access point. The access point provides connection to the wired network WLANs operate at bit-rates as high as 11 Mb/s and can use either a FHSS (Frequency Hopping Spread Spectrum) or a DSSS (Direct Sequence Spread Spectrum). In the case of FHSS systems, hopping sequences span over 79 channels, each one 1 MHz wide, while, DSSS systems use a 11-chip Barker sequence and their bandwidth is roughly equal to 20 MHz.

For more information regarding the IEEE signal please refer to IEEE Std 802.11-1997, IEEE standard for Wireless LAN Medium Access Control (MAC) and Physical Layer (PHY) specifications.

However, Bluetooth provides interconnection of devices in the user's vicinity in a range of about 10 m. The Bluetooth system uses the ISM frequency band at 2.4 GHz, i.e., the same as the WLAN networks occupy. The data bits are modulated using Gaussian frequency shift keying and transmitted using frequency-hopping spread spectrum (FHSS). Bluetooth occupy 79 MHz of the ISM band by using 79 different frequency channels, each 1 MHz wide. The Bluetooth transmitter/receiver stays 625 µs, a time slot, in every frequency channel, i.e., the system changes channel 1600 times per second. The Bluetooth transmitter is only active 366 µs out of the 625 µs long time slot, thus giving a maximum payload size of 366 bits per time slot. Bluetooth can provide a bit-rate equal to 1 Mb/s. A FHSS scheme is used at the physical level; each master chooses a different hopping sequence so that piconets can operate in the same area without interfering with each other.

Both IEEE 802.11b and Bluetooth are designed to cope with the interference from (a limited number of) other IEEE 802.11b or Bluetooth networks, respectively. In the Direct Sequence Spread Spectrum DSSS of the IEEE802.11(b) the power of a data signal is spread out with a Pseudo Noise PN sequence over a large band, the so-called channel bandwidth W. At the receiver the DSSS signal is despreaded with the same PN sequence. The bandwidth of the received signal after despreading corresponds to the Nyquist bandwidth B of the data signal and is determined by the data rate $r_b$. A narrow-band interferer like a Continuous Wave CW or a Gaussian Frequency Shift Keying GFSK modulated signal e.g. a Bluetooth signal, that is also despreaded at the receiver can be treated within B as Additive White Gaussian Noise AWGN.

At the receiver the DSSS signal is multiplied with the same PN sequence corresponding to the transmitted one. This operation is usually performed at a DSSS receiver in order to detect the DSSS signal and suppress any narrow-band interference signals, like a Bluetooth GFSK modulated signal. However, the presence of a narrow-band interference signal is despreaded to the channel bandwidth and can be considered as within the Nyquist bandwidth B as AWGN assuming that the spreading is large enough. This leads to a decrease of the Signal to Noise ratio SNR at the input of the DSSS receiver. The desired signal can be an IEEE802.11(b) DSSS signal, so that the received signal can represent an IEEE802.11(b) DSSS signal and a narrow-band interferer signal like a Bluetooth signal.

The acquisition and tracking of the IEEE802.11(b) system is the most critical component of the receiver, since the acquisition and tracking is partially not relying on the spreading gain. Hence, a narrow-band interferer is especially harmful, if e.g. the receiver is trying to acquire synchronization.

Since the IEEE 802.11b as well as the Bluetooth systems use the ISM frequency band, interferences may occur, especially when a Bluetooth signal hops into the band of the IEEE802.11b signal. Therefore, there is a need to cancel the influence of the narrow-band interferer or Bluetooth interferer.

It is therefore an object of the invention to find and cancel narrow-band interference signals in a transmission spectrum.

This object is solved by a method of canceling a narrow-band interference signal according to an embodiment of the invention, and an apparatus for canceling a narrow-band interference signal according to an embodiment of the invention.

Therefore, a method of canceling a narrow-band interference signal in a receiver is provided. A reference signal ref_in is subtracted from a received input signal IN. The phase of a result of the subtraction is calculated on the basis of an arctangent function. An unwrap function on the output signal from the arctangent function is performed by removing the modulo 2Π limitation introduced with the arctangent function, in order to produce an absolute phase representation. A frequency offset is determined by comparing phase representation values, which are shifted predetermined in time. The narrow-band interference signal is canceled based on the result of the determined frequency offset.

The advantage of this receiving device is that its detection range is wide enough, since it is not limited by ±π.

The invention is based on the idea to use a non-linear frequency detector to detect a narrow-band interference signal in a wide-band signal based on a reference signal. The output of the frequency error detector is used to cancel the narrow-band interference signal.

These and other aspects of the invention are apparent from and will be elucidated with reference to the embodiment(s) described hereinafter.

Figure 3:
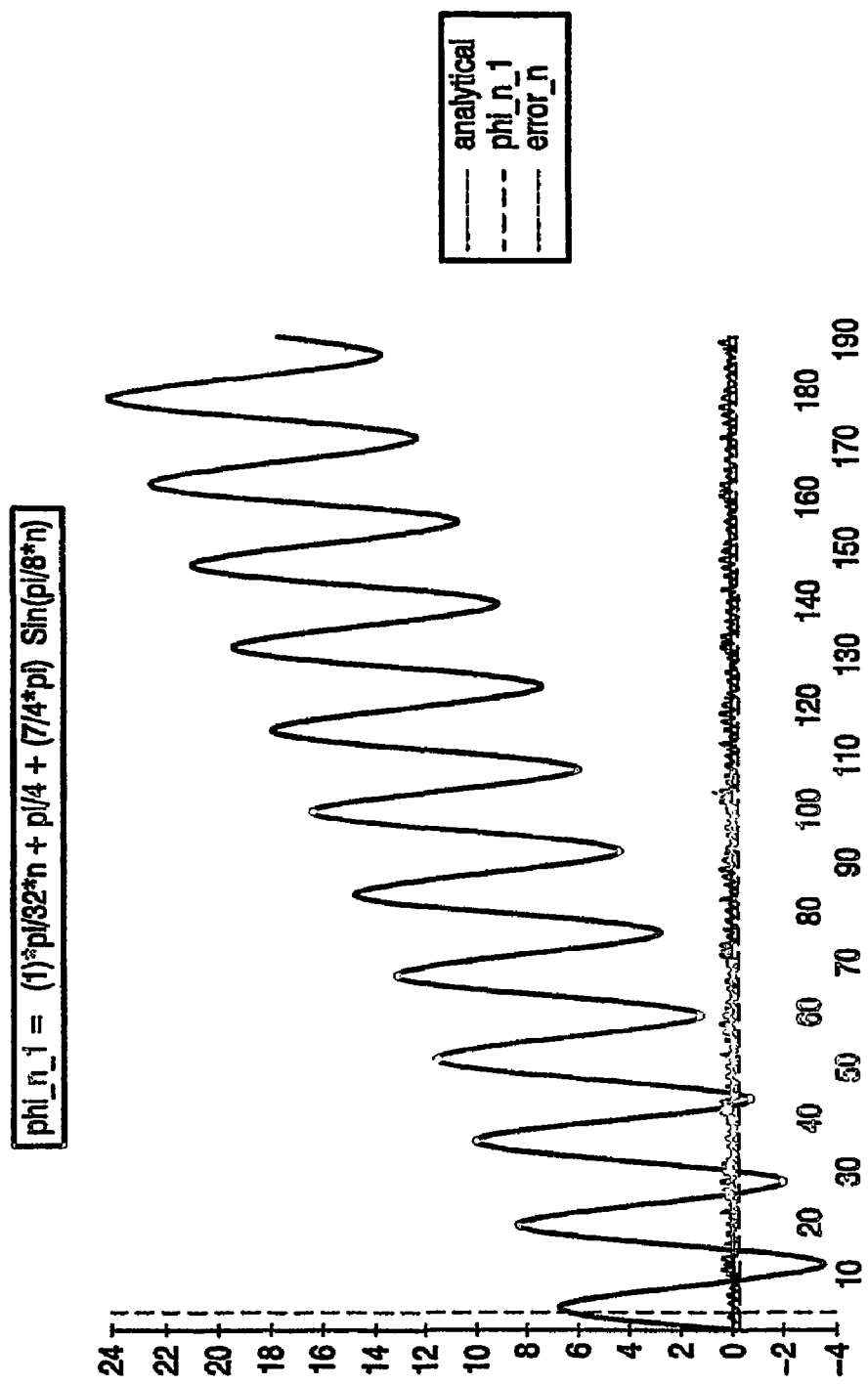
Figure 4:
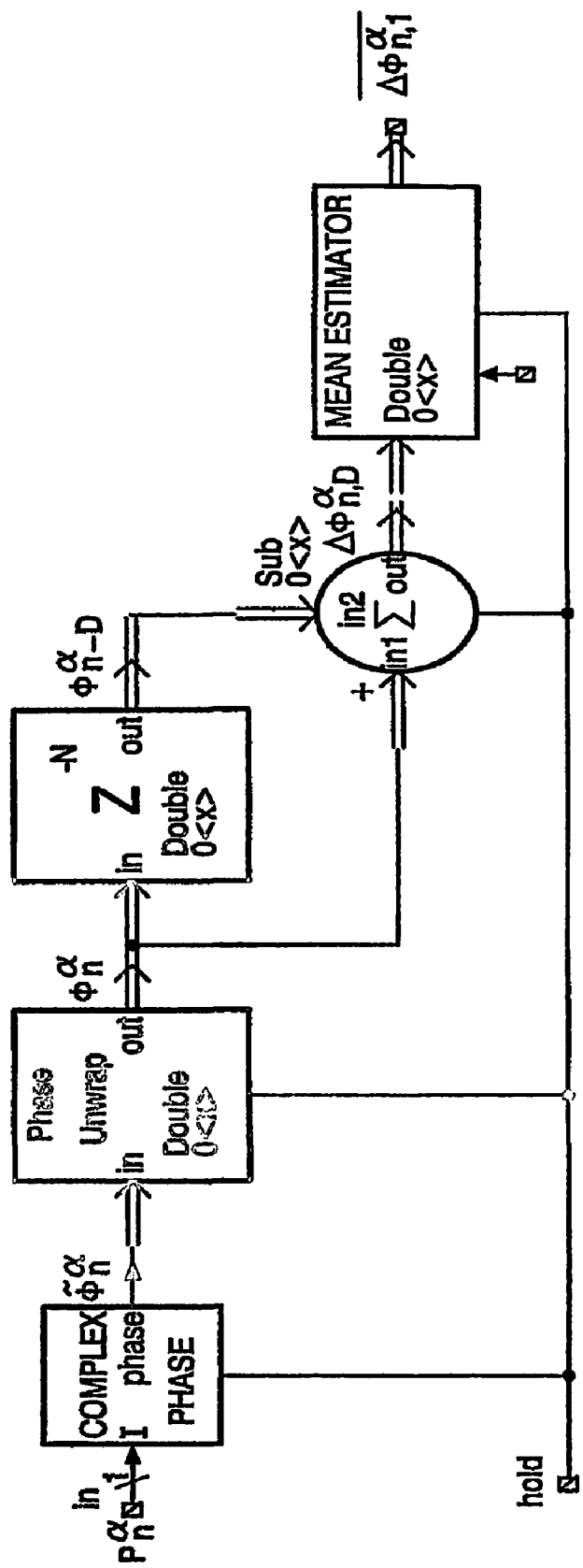
Figure 5:
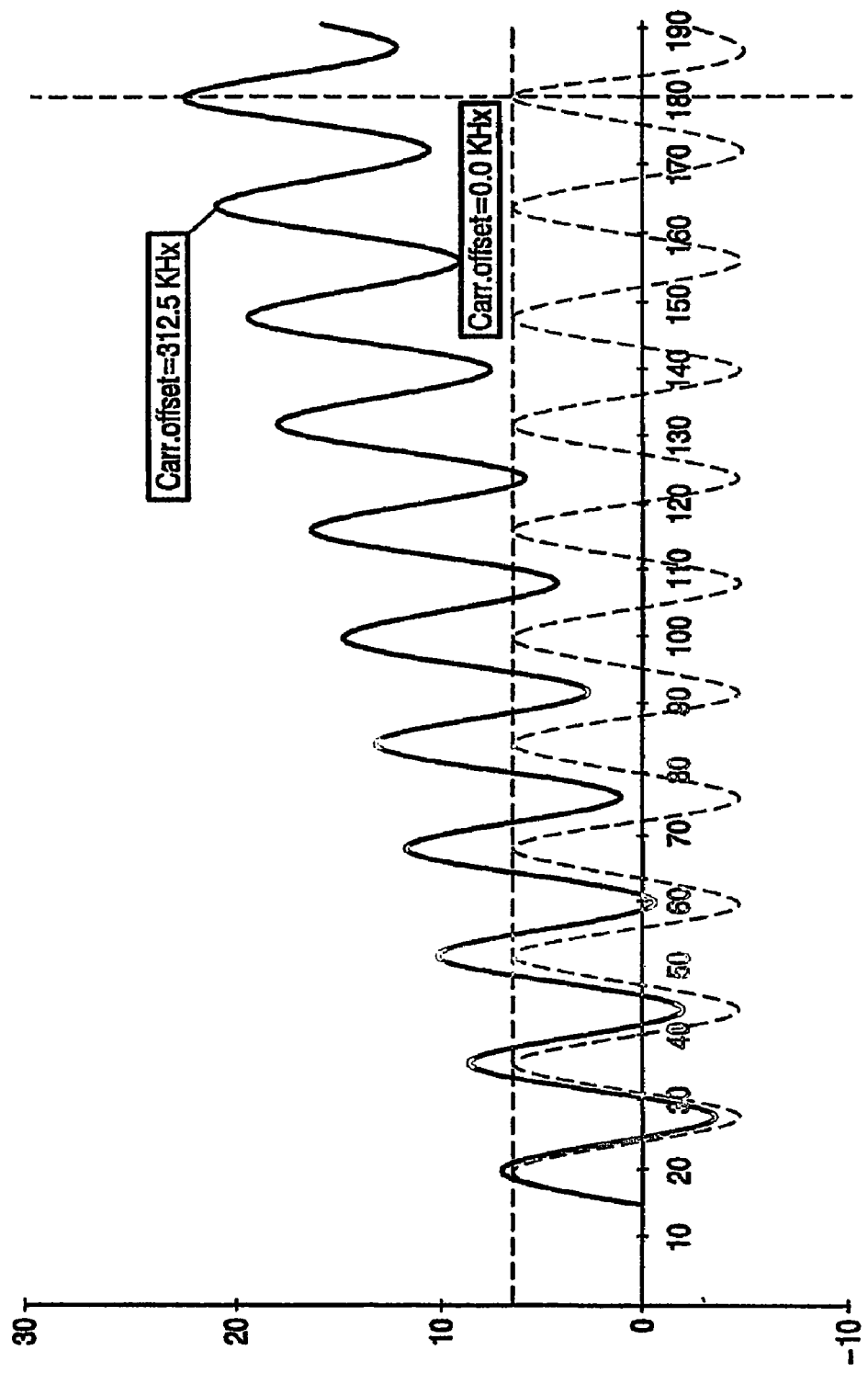
Figure 6:
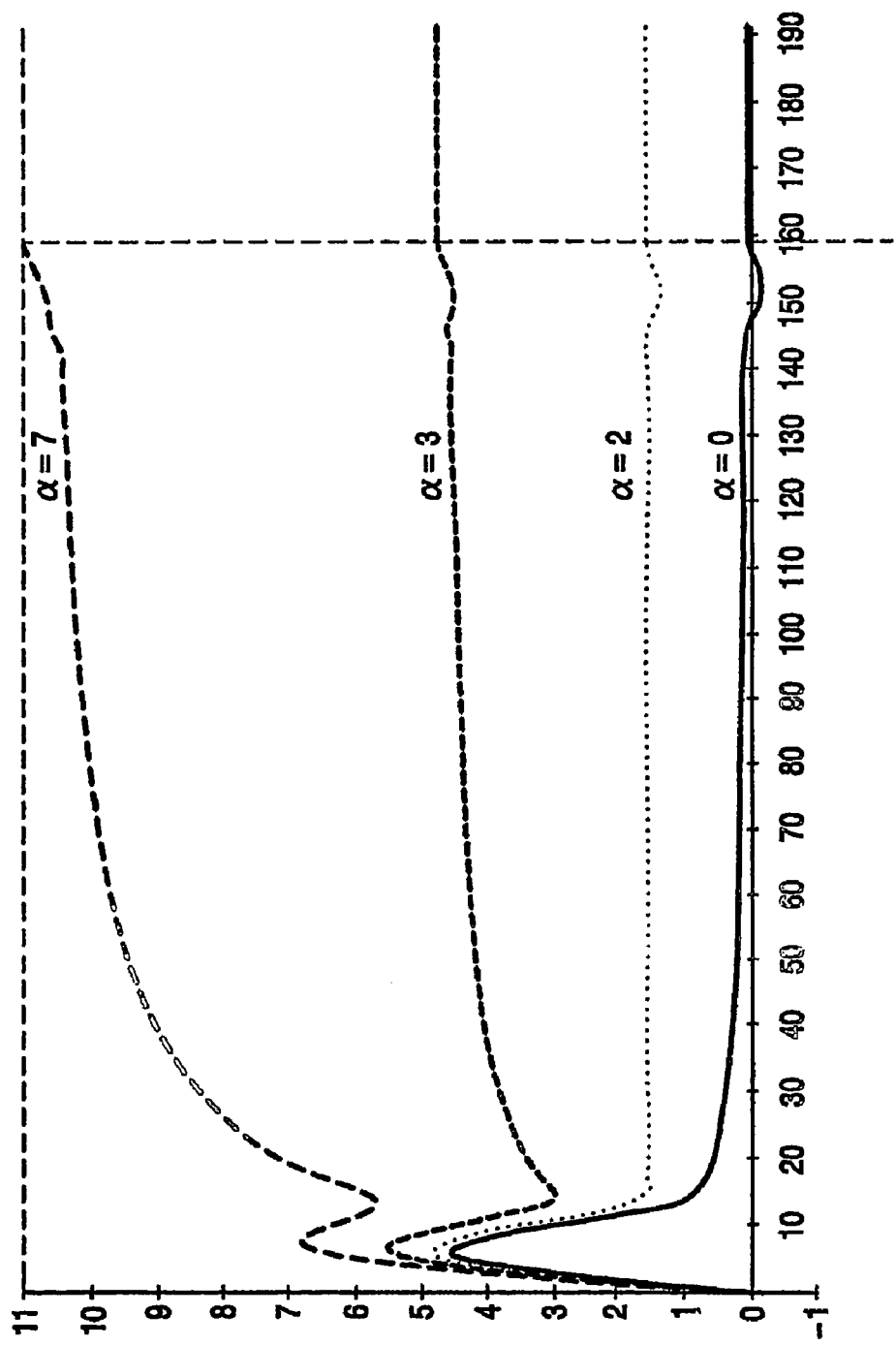
Figure 7:
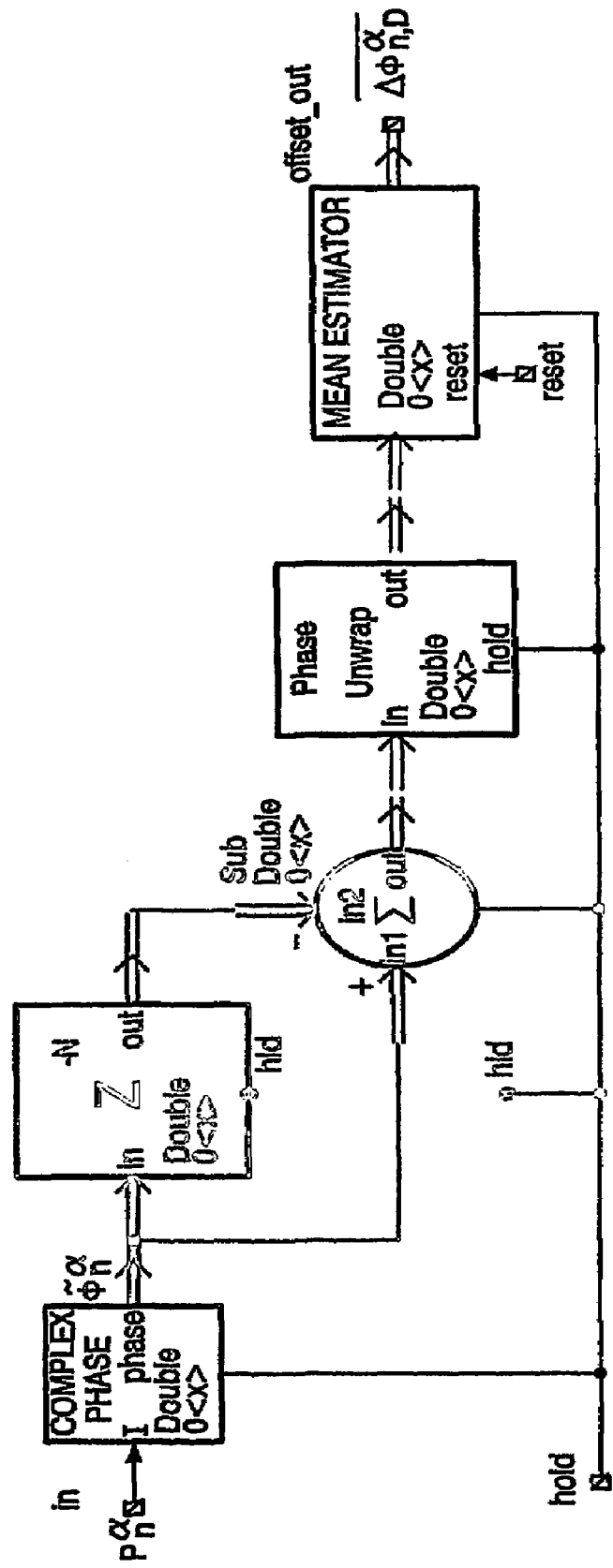
Figure 8:
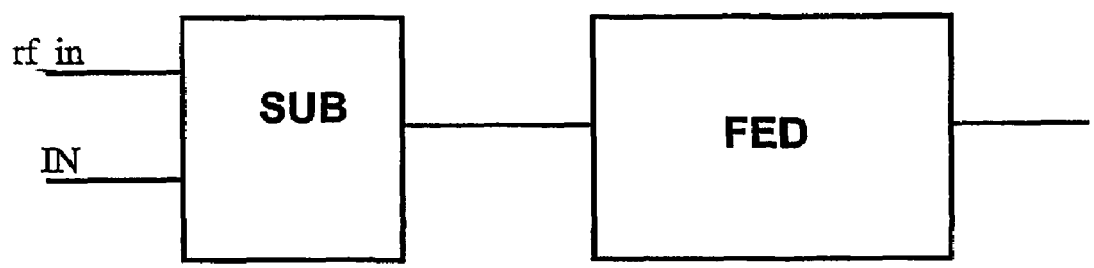

FIG. 3 shows an IEEE preamble phase with a carrier offset of one inter-carrier spacing α=1, FIG. 4 shows a block diagram of a preferred embodiment of a non-linear Frequency Error Detector (FED), FIG. 5 shows a 16 sample-delayed IEEE preamble phase with no frequency offset (α=0), and with Δf=312.5 kHz frequency offset (one inter-carrier spacing, α=1), FIG. 6 shows an output of a non-linear Frequency Error Detector (FED) for different carrier frequency offsets α=0, 1, 3, 7, FIG. 7 shows a block diagram of the frequency error detector FED, and FIG. 8 shows a block diagram of an interference eliminator means.

The interference cancellation is based on the use of interference suppression filters prior to the acquisition part of the IEEE802.11(b) receiver system. The interference cancellation method works autonomously, which means that there is no feedback from the acquisition part of the IEEE802.11(b) receiver system. This requirement is based on that the interference cancellation algorithm can be added to existing system without changing the architecture. The optimization of the parameters of the interference cancellation method should be performed.

According to an embodiment of the invention, the interference cancellation is performed using non-linear carrier offset detector.

First of all, the non-linear frequency error detector FED is described in detail before the interference cancellation is described. The non-linear frequency detector operates on the IEEE802.11a system at 5×GHz and in the time domain by defining the phase on sample by sample basis of the in-phase and quadrature components without a modulo $2\pi$ limitation. The removal of this limitation is performed by a phase unwrap function as described below.

The Frequency Error Detection is described with reference to Orthogonal frequency division multiplexing (OFDM) which is a robust technique for efficiently transmitting data through a channel. The technique uses a plurality of subcarrier frequencies (sub-carriers) within a channel bandwidth to transmit the data. These sub-carriers are arranged for optimal bandwidth efficiency compared to more conventional transmission approaches, such as frequency division multiplexing (FDM), which wastes large portions of the channel bandwidth in order to separate and isolate the sub-carrier frequency spectra and thereby avoid inter-carrier interference (ICI).

The carrier frequency offset estimation is performed in the time domain by defining the phase on a sample-by-sample basis of the in-phase and quadrature components. This definition of the phase for every incoming signal can be seen as a representation of the incoming signal in the Phase Domain, where the phase domain is defined as follows:

The phase domain represents on a sample basis the phase between every in-phase (I(t)) and quadrature (Q(t)) component of the incoming complex signal (x(t)) as a function of time.

In the phase domain, the subcarrier ambiguity problem will be introduced by the calculation of the phase with the arctangent function on the incoming complex (in-phase, quadrature) samples. The arctangent function has a range which is limited to $\pm\pi$ modulo $2\pi$. The modulo $2\pi$ of the arctangent function introduces a non-linearity which causes a phase ambiguity of $\pm\pi$ which is due to the subcarrier ambiguity of $\pm\tfrac{1}{2}$, as will be shown in the sequel.

Let the carrier frequency offset be expressed as $$\Delta f = \alpha \frac{1}{NT_s}, \alpha \in R \tag{1}$$

with $T_s$ the time between two samples, N the number of subcarriers of the OFDM signal and $NT_s$ the period time of an OFDM symbol, so Eq. (1) shows the carrier frequency offset expressed in $\alpha$ times the intercarrier spacing ($1/NT_s$).

If we use the well-known Fourier transform pair $$X(f-\Delta f) \leftrightarrow e^{(j2\pi\Delta ft)} x(t), \tag{2}$$

with x(t) the incoming OFDM signal, then Eq. (2) shows that a constant frequency shift causes a linear increasing phase of the OFDM signal x(t). This linear behavior of the phase can be exploited to estimate, in the time domain, the carrier frequency offset of x(t). If we want to use the phase of x(t) we need the arctangent function $$\psi(t) = 2\pi\Delta ft + \arg\{x(t)\} = \Delta\psi(t) + \Theta(t) = \arctan\left\{\frac{Q(t)}{I(t)}\right\} \bmod(2\pi) \tag{3}$$

If we combine Eq. (1) and Eq. (3) we obtain $$\psi(t) + 2\pi\frac{\alpha}{NT_s}t + \Theta(t) \bmod(2\pi) \tag{4}$$

Substitution of the OFDM symbol period in Eq. (4) yields $$\psi(NT_s) = \alpha 2\pi + \Theta(NT_s) \bmod(2\pi) \tag{5}$$

The modulo ($2\pi$) part of Eq. (5) limits the value of $\psi(NT_s)$ at $\pm\pi$ so, the maximum value of $\alpha$ is then $$\alpha_{\max} = \frac{\psi(NT_s)_{\max} - \Theta(NT_s)}{2\pi} = \pm\left(\frac{1}{2} - \frac{\Theta(NT_s)}{2\pi}\right) \tag{6}$$

Eq. (6) shows that the subcarrier ambiguity is introduced by the modulo $2\pi$ of the arctangent function. This modulo $2\pi$ of the arctangent function is a nonlinear operation on $\psi(t)$, so if we want to use the phase $\psi(t)$ we need the arctangent function without the modulo $2\pi$ non-linearity. A non-linear FED is described which is able to remove this non-linearity, this removal is also a non-linear operation on the phase. By removing the modulo $2\pi$ limitation, $\psi(t)$ becomes a continuous function without any phase jumps. If we look in the complex plane (in-phase component on x-axes and quadrature component on y-axes) a phase jump will occur if the phase moves from the first quadrant to the third or fourth quadrant (or vice versa) with an absolute value larger than $\pi$. Thus discontinuities in the phase occur if the phase passes the in-phase axes in the complex plane with an absolute value larger than $\pi$.

In the further part of this document, the removal of these phase jumps is called: "phase unwrapping". This phase unwrapping results in an absolute phase function $\Phi(t)$, which means that the value of the phase may be, for example, $\Phi(t) = 23.67\pi$ and is not limited to the relative value of $\psi(t) = -0.33\pi \bmod (2\pi)$. It is this absolute value representation $\Phi(t)$ that gives us the wide capture range of the proposed non-linear FED. It will be shown that the capture range of the FED is not limited anymore by $\pm\tfrac{1}{2}$ times the intercarrier spacing (assuming $\Theta(NT_s)/2\pi$ equals zero) introduced by the arctangent function.

In the following the phase representation of a discrete OFDM signal with frequency offset will be described. The discrete OFDM signal $$x_n^\alpha = \sum_{i=-\frac{N}{2}+p}^{\frac{N}{2}-p} B_i e^{j2\pi\left(\frac{i}{NT_s}+\frac{\alpha}{NT_s}\right)nT_s} = e^{j\alpha\frac{2\pi}{N}n} \sum_{i=-\frac{N}{2}+p}^{\frac{N}{2}-p} B_i e^{j\left(i\frac{2\pi}{N}n\right)}, \quad (7)$$

in which p is the number of unused subcarriers of the OFDM symbol, $B_i$ is a complex signal which represents the initial phase and amplitude of the i-th subcarrier and n is the sample index. The phase of $x_n^\alpha$ $$\Theta_n^\alpha = \arg\{x_n^\alpha\} = \alpha\frac{2\pi}{N}n + \arg\left\{\sum_{i=-\frac{N}{2}+p}^{\frac{N}{2}-p} B_i e^{j\left(i\frac{2\pi}{N}n\right)}\right\}, \quad (8)$$

is a summation of a linear function of $\alpha$ and the summation of the phases of the subcarriers. This linear function of $\alpha$ can also be obtained for a specific discrete OFDM preamble signal, as will be shown in the following where the phase representation of the IEEE P802.11a/D7.0 preamble (further referred to as: "IEEE preamble") is used in W-LAN OFDM systems. This IEEE W-LAN OFDM system uses the following figs.; N=64 points (I)FFT, with a sample frequency of $F_s$=20 MHz ($T_s$=50 ns) and p=6 unused subcarriers, substituting these figs. in Eq. (7) and Eq. (8) we obtain $$x_n^\alpha = e^{j\alpha\frac{\pi}{32}n} \sum_{i=-26}^{26} B_i e^{j\left(i\frac{\pi}{32}n\right)}, \quad (9)$$

for the OFDM signal and $$\Theta_n^\alpha = \alpha\frac{\pi}{32}n + \arg\left\{\sum_{i=-26}^{26} B_i e^{j\left(i\frac{\pi}{32}n\right)}\right\}, \quad (10)$$

for the phase of the OFDM signal.

The preamble is defined in IEEE P802.11a/D7.0. It is a short OFDM symbol consisting of 12 subcarriers which are modulated by the elements $S_i$ of the sequence given by:

$S=S_{-1},\ldots,S_i=$
$\sqrt{13/6}(0,0,1+j,0,0,0,-1-j,0,0,0,1+j,0,0,0,-1-j,0,0,0,-1-j,0,0,0,1+j,0,0,0,\ldots,25,26$  (11)

with the indexes (−26, . . . ,26) referring to the subcarrier numbers of the OFDM symbol. The multiplication by the factor $\sqrt{13/6}$ is needed to normalize the average power because the IEEE preamble only uses 12 out of the 52 subcarriers. It can be seen from Eq. (11) that only the subcarriers with an index which is a multiple of four are non-zero, so substitution of m=i/4 in Eq. (9) and exchanging the elements $B_i$ with the elements $S_i$ yields, $$p_n^\alpha = \sqrt{13/6}\, e^{j\alpha\frac{\pi}{32}n} \sum_{m=-6}^{6} S_m e^{jm\frac{\pi}{8}n} \quad m \neq 0, \quad (12)$$

the presentation of the IEEE preamble and $$\tilde{\phi}_n^\alpha = \alpha\frac{\pi}{32}n + \arg\left\{\sum_{m=-6}^{6} S_m e^{jm\frac{\pi}{8}n}\right\} \quad m \neq 0, \quad (13)$$

the phase of this IEEE preamble. The subcarrier $S_0$ is equal to zero (DC-subcarrier), so the index m=0 is not used for the IEEE preamble. Eq. (12) shows that if m=±1 the fundamental frequency $F_0$=1/$NT_s$ in the OFDM signal $$F_p = 4F_0 = 4\frac{1}{64T_s} = \frac{1}{16T_s}. \quad (14)$$

Then the period time or periodicity of the preamble $$T_p = \frac{1}{F_p} = \frac{1}{4}T_0 = 16T_s. \quad (15)$$

is 16 samples (not 64 as the OFDM signal), so the IEEE preamble has a duration of 16 samples (800 ns).

If we look somewhat closer at the components of the sequence S we see that $$S_m = -S_{-m} \Rightarrow S_m e^{j\beta m} + S_{-m} e^{-j\beta m} = j2S_m \sin(\beta_m) \; m=1,3,5, \quad (16)$$

$$S_m = S_{-m} \Rightarrow S_m e^{j\beta m} + S_{-m} e^{-j\beta m} = 2S_m \cos(\beta_m) \; m=2,4,6,$$

with $\beta_m$ an arbitrary number. Using this goniometric equality in Eq. (12) yields $$p_n^\pi = 2\sqrt{13/6}\, e^{j\alpha\frac{\pi}{32}n}\{S_2\cos\left(2\frac{\pi}{8}n\right) + S_4\cos\left(4\frac{\pi}{8}n\right) + \quad (17)$$
$$S_6\cos\left(6\frac{\pi}{8}n\right) + j[S_1\sin\left(\frac{\pi}{8}n\right) + S_3\sin\left(3\frac{\pi}{8}n\right) + S_5\sin\left(5\frac{\pi}{8}n\right)]\},$$

and with $$S_1 = S_2 = -(1+j) = -\sqrt{2}\, e^{j\frac{\pi}{4}} \quad (18)$$
$$S_3 = S_4 = S_5 = S_6 = (1+j) = \sqrt{2}\, e^{j\frac{\pi}{4}}.$$

the representation of the IEEE preamble becomes $$p_n^\pi = 2\sqrt{13/6}\, e^{j\left(\alpha\frac{\pi}{32}n+\frac{\pi}{4}\right)}\{-\cos\left(2\frac{\pi}{8}n\right) + \cos\left(4\frac{\pi}{8}n\right) + \quad (19)$$
$$\cos\left(6\frac{\pi}{8}n\right) + j[-\sin\left(\frac{\pi}{8}n\right) + \sin\left(3\frac{\pi}{8}n\right) + \sin\left(5\frac{\pi}{8}n\right)]\}.$$

The phase of the IEEE preamble $$\tilde{\phi}_n^\alpha \frac{\pi}{4} + \alpha\frac{\pi}{32}n + \theta_n, \quad (20)$$

$$\theta_n = \arctan\left\{\frac{-\sin\left(\frac{\pi}{8}n\right) + \sin\left(3\frac{\pi}{8}n\right) + \sin\left(5\frac{\pi}{8}n\right)}{-\cos\left(2\frac{\pi}{8}n\right) + \cos\left(4\frac{\pi}{8}n\right) + \cos\left(6\frac{\pi}{8}n\right)}\right\}$$

is a summation of an initial phase ($\pi/4$), a linear changing phase as a function of the carrier frequency offset $$\alpha \frac{\pi}{32} n$$

and an arctangent function performed on a summation of sinusoids with multiple frequencies ($\theta_n$). The behavior of $\theta_n$ is not easy to determine analytically, so it is obtained via simulations where the in-phase and quadrature components for every sample of the IEEE preamble (periodic with 16) in the upper part (complex plane representation) and the arctangent values of the IEEE preamble in the lower part (phase domain representation) are determined. It can be seen that a modulo $2\pi$ phase correction needs to be performed between samples 1,2 (mod 16), 6,7 (mod 16), 10,11 (mod 16) and 13,14 (mod 16), because between these consecutive samples the phase of the IEEE preamble passes the in-phase axes with an absolute value larger than $\pi$.

The $2\pi$ phase correction is performed by an unwrap function ($U_n$) and can be described as follows: The unwrap function ($U_n$) accumulates k time $2\pi$, where k depends on the wrapped function to which $U_n$ is applied. k will be increased by one if the difference between the last corrected sample and the current sample is smaller than $-\pi$. k will be decreased by one if the difference between the last corrected sample and the current sample is larger than $\pi$.

Figure 1:
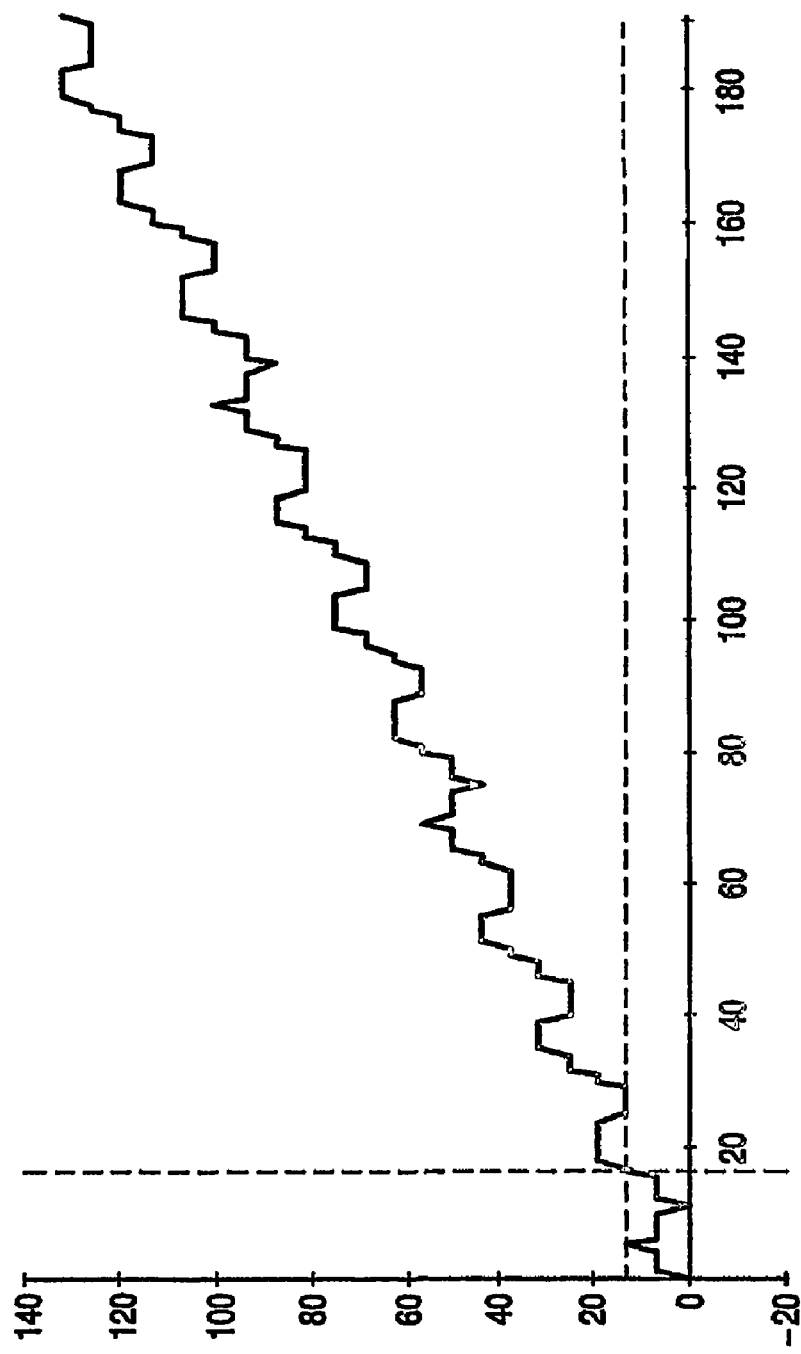
FIG. 1 shows a possible curve of an unwrap function $U_n$.

FIG. 1 shows a possible curve of $U_n$, every function value $U_n$ is a multiple of $2\pi$ (k times $2\pi$) and depends on the wrapped function. Applying the unwrap function Un to the wrapped phase $\phi_n^\alpha$ of the IEEE preamble yields $$\phi_n^\alpha = \frac{\pi}{4} + \alpha \frac{\pi}{32} n + \theta_n, \quad (21)$$

the unwrapped phase of the IEEE preamble. The wrapped phase $\phi_n^0$ and the unwrapped phase $\phi_n^0$ are represented by the solid line and dotted line respectively, in FIG. 7. It can be seen from FIG. 2 that the unwrapped phase $\phi_n^0$ behaves like a sinewave. Eq. (21) shows that the sinewave behavior of $\phi_n^\alpha$ with $\alpha=0$, is the behavior of $\theta_n$. If we take a closer look at this sinewave behavior we are able to determine an approximation of $$\phi_n \approx \frac{7\pi}{4} \sin\left(\frac{\pi}{8} n\right), \quad (22)$$

and Eq. (21) can be approximated with $$\phi_n^\alpha \approx \frac{\pi}{4} + \alpha \frac{\pi}{32} n + \frac{7\pi}{4} \sin\left(\frac{\pi}{8} n\right). \quad (23)$$

If we look at Eq. 20, we see that the carrier frequency offset gives a linear increase of the phase. If we are able to determine the angle of direction of the wrapped phase $\phi_n^\alpha$, then we know the frequency offset represented by $\alpha$. By applying the unwrap function $U_n$ to $\phi_n^\alpha$, we obtain the unwrapped phase $\phi_n^\alpha$ shown by Eq. (21). If we look at FIG. 2, we can see that the unwrapped phase $\phi_n^1$ increases linearly due to the carrier frequency offset $\Delta f=312.5$ kHz of one intercarrier spacing ($\alpha=1$).

As mentioned earlier, the behavior of $\theta_n$ is approximated with a sinewave, and it can be seen from FIG. 3 that this approximation can also be used in the case $\alpha\neq0$.

The unwrapping and the subsequent detection of the angle of direction of the wrapped phase $\phi_n^\alpha$ are performed by the non-linear FED and will be described in detail in the following. The carrier frequency offset estimation, as stated before, is performed in the time domain by defining the phase on a sample-by-sample basis of the in-phase and quadrature components without the modulo $2\pi$ limitation. The removal of this limitation is performed by the phase unwrap function.

If we look at FIG. 3, it can be seen that the angle of direction can be defined by taking the difference between two function values which are shifted in time and have equal values in the case that there is no carrier frequency offset ($\alpha=0$). It can be seen from Eq. 15 and Eq. 23 that the periodicity of $\phi_n^\alpha$ and $\phi_n^\alpha$ equals 16, so every two function values which are 16 samples apart from each other have the same value, as can also be verified graphically in FIG. 2. The difference between $\phi_n^\alpha$ and $\phi_{n+16}^\alpha$ is constant for every n and proportional to the carrier frequency offset. If this constant value is contaminated by noise, the influence of this noise can be decreased by averaging the samples. All of the above mentioned operations with the signal names are shown in FIG. 4, the block diagram of the non-linear FED.

Figure 2:
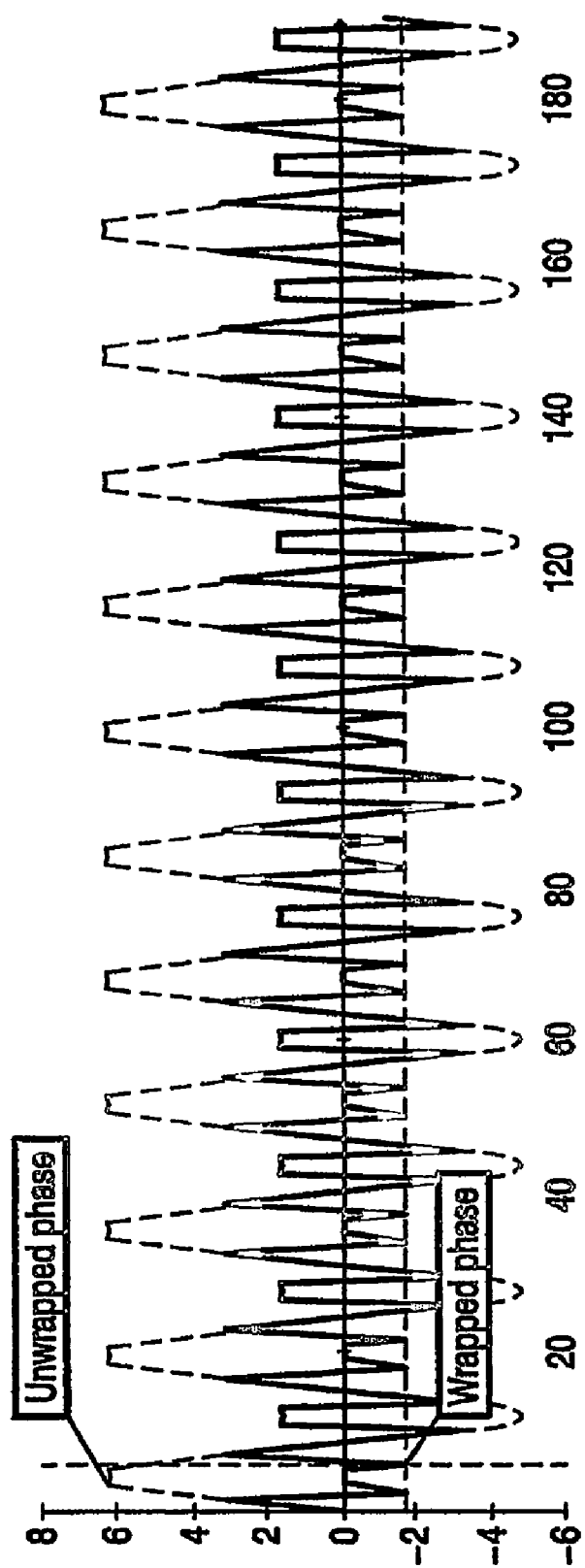
FIG. 2 shows a wrapped and an unwrapped IEEE preamble phase with α=0.

The signal $p_n^\alpha$ described by Eq. 19 and shown in FIG. 4 for $\alpha=0$ is the input signal for the "complex phase" block. The output signal of the "complex phase" block is the wrapped phase $$\tilde{\phi}_n^\alpha = \frac{\pi}{4} + \alpha \frac{\pi}{32} n + \theta_n, \mod(2\pi) \quad (24)$$

of $p_n^\alpha$ and is shown as the solid line in FIG. 2 with no carrier frequency offset ($\alpha=0$).

Applying the unwrap function $U_n$ to the input signal $\phi_n^\alpha$ yields $$\phi_n^\alpha \approx \frac{\pi}{4} + \alpha \frac{\pi}{32} n + \frac{7\pi}{4} \sin\left(\frac{\pi}{8} n\right), \quad (25)$$

at the output of the "phase unwrap" block. This unwrapped phase signal is shown as the dotted lines in FIG. 2 for $\alpha=0$ and in FIG. 3 for $\alpha=1$.

The output signal of the "$Z^{-N}$" block is the delayed version of the unwrapped phase signal $$\phi_{n-D}^\alpha \approx \frac{\pi}{4} + \alpha \frac{\pi}{32}(n-D) + \frac{7\pi}{4} \sin\left\{\frac{\pi}{8}(n-D)\right\}, \quad (26)$$

with D the number of delayed samples. With some goniometric equalities, Eq. 26 can be rewritten as $$\phi_{n-D}^\alpha \approx \frac{\pi}{4} + \alpha \frac{\pi}{32}(n-D) + \frac{7\pi}{4}\left[\sin\left(\frac{\pi}{8} n\right)\cos\left(\frac{\pi}{8} D\right) - \cos\left(\frac{\pi}{8} n\right)\sin\left(\frac{\pi}{8} D\right)\right], \quad (27)$$

substituting D=16 (the period of the IEEE preamble) in Eq. 27 yields $$\phi_{n-16}^{\alpha} \approx (1-2\alpha)\frac{\pi}{4} + \alpha\frac{\pi}{32}n + \frac{7\pi}{4}\sin\left(\frac{\pi}{8}n\right), \tag{28}$$

and is shown in FIG. 5 for $\alpha=0$ and $\alpha=1$.

The output signal of the "subtract" block is the unwrapped phase difference signal $$\Delta\phi_{n,D}^{\alpha} \approx \tag{29}$$

$$\frac{\pi}{4} + \alpha\frac{\pi}{32}n + \frac{7\pi}{4}\sin\left(\frac{\pi}{8}n\right) - \left[\frac{\pi}{4} + \alpha\frac{\pi}{32}(n-D) + \frac{7\pi}{4}\sin\left\{\frac{\pi}{8}(n-D)\right\}\right] =$$

$$\alpha\frac{\pi}{32}D + \frac{7\pi}{4}\left\{\left[1 - \cos\left(\frac{\pi}{8}D\right)\right]\sin\left(\frac{\pi}{8}n\right) + \sin\left(\frac{\pi}{8}D\right)\cos\left(\frac{\pi}{8}n\right)\right\},$$

and for D=16 Eq. 29 becomes $$\Delta\phi_{n,16}^{\alpha} \approx \alpha\frac{\pi}{2}, \tag{30}$$

The sinewave behavior in the beginning of the curve is a switch-on phenomenon because the first 16 samples of $\phi_{n-16}^{\alpha}$ are equal to zero. These first 16 samples cannot be used for the detection of the carrier frequency offset, so in the case of the IEEE OFDM system, only 144 out of the 160 samples can be used.

The output signal of the "mean estimator" block is the unwrapped phase difference signal average with a sliding window of 144 samples. The mean estimator takes the sum of the last 144 samples and divides this number by 144. The output of the mean estimator, also the FED output, is shown in FIG. 6 for different values of $\alpha=0, 1, 3, 7$.

The value of the $160^{th}$ sample (sample number 159) is the exact representation of the carrier frequency offset, because the switch-on phenomenon has no influence on that sample anymore.

The unwrap function Un increases or decreases the $2\pi$ counter k depending on the phase difference between the last corrected sample and the current sample. If this phase difference is larger than the absolute value $|\pi|$ due to carrier frequency offset (large $\alpha$), noise or any other cause than the arctangent function, the FED will not be able to correct this. This limitation is the capture range of the non-linear FED and can be obtained by finding the n, whereby $\phi_n^{\alpha=0}$ shows a maximum phase change $$\max_n\left\{\frac{d\phi_n^{\alpha}}{dn}\bigg|_{\alpha=0}\right\} \approx \max_n\left\{\frac{7\pi^2}{32}\cos\left(\frac{\pi}{8}n\right)\right\} = \frac{7\pi^2}{32}, \text{ for } n = 0 \mod(8) \tag{31}$$

substituting this in Eq. 29 with D=1 (consecutive samples) gives, $$\Delta\phi_{0,1}^{\alpha_{\max}} \approx \alpha_{\max}\left(\frac{\pi}{32}\right) + \frac{7\pi}{4}\sin\left(\frac{\pi}{8}\right) = \pi\left[\frac{\alpha_{\max}}{32} + \frac{7}{4}\sin\left(\frac{\pi}{8}\right)\right]. \tag{32}$$

With the limitation of $\pm\pi$ between two consecutive samples, the capture range $\alpha_{max}$ will then be $$\pi\left[\frac{\alpha_{\max}}{32} + \frac{7}{4}\sin\left(\frac{\pi}{8}\right)\right] = \pm\pi \Rightarrow \alpha_{\max} \approx \pm 32\left[1 - \frac{7}{4}\sin\left(\frac{\pi}{8}\right)\right] \approx \pm 10, \tag{33}$$

this number is not the exact capture range due to the approximation by the sinewave. It can be seen from Eq. 33 that the capture range is limited by the maximum phase jump in the sinewave part of $\phi_n^{\alpha}$. This phase jump between two consecutive samples can be decreased by i.a. over-sampling. This over-sampling increases the capture range. A factor of two over-sampling yields $$\alpha_{\max} \approx \pm 64\left[1 - \frac{7}{4}\sin\left(\frac{\pi}{16}\right)\right] \approx \pm 42, \tag{34}$$

this number is not the exact capture range due to the approximation by the sinewave.

The theoretical figs. obtained, until now, for the non-linear FED with the IEEE preamble are:

Output value is $$\Delta\phi_{n,16}^{\alpha} \approx \alpha\frac{\pi}{2},$$

Capture range without over-sampling is: $\alpha_{max}\approx\pm10$ ($\Delta f_{max}\approx\pm3.2$ MHz)

Capture range with over-sampling by 2 is: $\alpha_{max}\approx\pm42$ ($\Delta f_{max}\approx\pm13.1$ MHz)

Now the interference cancellation using the above frequency error detector (but for an IEEE 802.11b signal at 2.4×GHz) is described in more detail:

According to an embodiment of the invention, the interference cancellation is performed for Bluetooth signals. The Bluetooth signal is GFSK modulated with a modulation index of m=0.28 ... 0.35 and a bandwidth bit duration product that equals BF=0,5. The carrier frequency peak deviation is chosen to be $$f_d = \frac{m}{2}r_b = \frac{m}{2T}$$

where $r_b$ represents the bit rate, which equals 1 Mbps. The information bits $b_n$ are shaped by a Gaussian filter and thus $$b_g(t) = \sum_{n=-\infty}^{\infty} I_n q(t-nT),$$

with $I_n$ is equal to 1 if $b_n$ is equal to one and −1 if $b_n$ is equal to zero and where $$q(t) = K \int_0^T e^{-\beta(t-\frac{T}{2})^2} dt$$

represents the Gaussian pulse shape with $$K = BT\sqrt{\frac{2\pi}{\ln 2}}$$

and $$\beta = \frac{2}{\ln 2}(\pi BT)^2.$$

The Bluetooth interference signal can be written as $$i_b(t) = e^{j2\pi\{f_d \int_{-\infty}^t b_g(\alpha)d\alpha + f_c t\}}$$

$$i_b(t) = e^{j2\pi\{\frac{mr_b}{2} \int_{-\infty}^t b_g(\alpha)d\alpha + f_c t\}}$$

with the time-varying phase $$\arg\{i_b(t)\} = \Phi(t) = m\pi r_b \int_{-\infty}^t b_g(\alpha)d\alpha + 2\pi f_c t \quad (35)$$

$$\Phi(t) = m\pi r_b \int_{-\infty}^t \left[\sum_{n=-\infty}^\infty I_n q(\alpha - nT)\right]d\alpha + 2\pi f_c t$$

If we look at the derivative $$\dot{\Phi}(t) = \frac{d\Phi(t)}{dt} = m\pi r_b b_g(t) + 2\pi f_c \quad (36)$$

of the time varying phase of Eq. (35), which represents the frequency of the FSK modulated Bluetooth signal. The first term of Eq (36) is varying with time while the second term is a constant value that is proportional with the carrier frequency of the Bluetooth FSK modulated signal. If $\Phi(t)$ is normalized on $2\pi r_b$ and we assume that $f_c$ is relevant with distances $kr_b$, (where k is an integer) to the carrier frequency of the desired DSSS signal. Therefore, $$\overline{\dot{\Phi}(t)} = \frac{m\pi r_b b_g(t) + 2\pi f_c}{m\pi r_b} \quad (37)$$

$$\overline{\dot{\Phi}(t)} = \frac{m}{2}b_g(t) + k = \frac{m}{2}\sum_{n=-\infty}^\infty I_n q(t - nT) + k$$

with k= . . . , −2, −1, 0, 1, 2, . . .

$\overline{\dot{\Phi}}(t)$ represents the normalized phase of only the Bluetooth signal. Therefore, no phase transitions due to the desired DSSS signal, i.e. the IEEE802.11(b) signal, are taken into account. The value of $I_n$ equals ±1 in a pseudo random behavior due to scrambling of the data bits $b_n$ (PN sequence). This means that the first term of Eq. (37) has zero mean, so that the value of k is a measure for the carrier frequency of the Bluetooth signal, i.e. the carrier frequency of the narrow-band interferer to be cancelled. Therefore, the value of k will give an indication of the frequency that is to be cancelled.

FIG. 8 shows a block diagram of an interference eliminator implementing the above principles. The eliminator comprises a non-linear carrier offset detector, i.e. a frequency error detector FED, and a subtracting unit SUB. The subtracting unit receives a reference signal ref_in and the received signal IN as inputs, and performs a subtraction operation i.e. the received signal IN is subtracted from the reference signal ref_in. The result of this subtraction is used as input signal of the non-linear carrier offset detector. Here, we assume that the received signal corresponds to the signal transmitted by the transmitter plus the narrow-band interferer. If the reference signal is known and the transmitter transmits this reference signal ref_in, then the result of the subtraction of the received signal from the reference signal will correspond to the narrow-band interferer, i.e. that signal that was introduced by the transmission of the signal transmitted by the transmitter. The set up and the function of the non-linear carrier offset detector or the frequency error detector FED has been described above with reference to FIG. 1 to 7 for a IEEE802.11a system but can also be used for a IEEE802.11b system with 2.4×GHz. The output of the non-linear carrier offset detector represents the above mentioned k-values according to which the carrier frequency of the narrow-band interferer is determined. The subtracting unit SUB as well as the frequency detector (in particular the unwrap function) can be put on a hold if no reference signal is available.

The actual interference cancellation can be performed by using the value of k to select a proper filter out of 2k+1 different filters in a filter bank. These two 2k+1 filters can have the optimal Wiener solution for filtering out the particular narrowband interference signal. The advantage of this filter-bank is that the filters could be small with a few taps because the shape and position of the interference is exactly known.

An alternative solution is to generate a signal, having same frequency as the determined carrier frequency of the narrow-band interferer, and subtract it from the distorted desired wide-band signal, so that the subtraction results in the desired wide-band signal.

The reference signal is considered as a transmitted signal, which is known to the receiver. The selection of a reliable reference signal is not trivial. In most practical situations this reference signal is not easy available. One solution is to use the training signal of the IEEE802.11b. This signal is known but it is merely used as a training sequence, for the cases that the narrow-band interferer hops into one of the IEEE802.11b bands after the training sequence of the IEEE802.11b has been transmitted, it is not possible to use the training sequence as reference signal anymore and the interference cancellation can not be performed accurately. However, as soon as the training sequence is transmitted again, the interference cancellation can also be performed again.

The embodiments of the invention are described with an IEEE 802.11b signal as wide-band signal and a Bluetooth signal as narrow-band interferer. However, the principles of the invention may be applied to every wired or wireless narrow-band signal introducing a frequency offset to a desired wide-band signal.

The above embodiments can be implemented by hardware or by software. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. A method of canceling a narrow-band interference signal in a receiver, comprising the steps of:
    subtracting a reference signal from a received input signal;
    calculating the phase of a result of the subtraction on the basis of an arctangent function,
    performing an unwrap function on the output signal from the arctangent function, by removing the modulo 2Π limitation introduced with the arctangent function, thereby producing an absolute phase representation,
    determining a frequency offset by comparing phase representation values which are shifted predetermined in time, and
    canceling the narrow-band interference signal based on the result of the determined frequency offset,
    wherein the unwrap function accumulates k times 2Π, where k depends on the wrapped function so that k will be increased by 1 if the difference between the last corrected sample and the current sample is smaller than −Π, and k will be decreased by 1 if the difference between the last corrected sample and the current sample is greater than Π.

2. A method according to claim 1, characterized in that the subtracting step can be put on a hold a predetermined period of time, if there is no reference signal available to perform the subtraction.

3. A method according to claim 1, characterized in that the unwrap function can be put on a hold a predetermined period of time, if there is no reference signal available to perform the unwrap function.

4. A method according to claim 1, characterized in that the canceling the narrow-band interference signal is performed by selecting a filter from within a filter-bank based on the value of k.

5. A method according to claim 1, characterized in that the canceling the narrow-band interference signal is performed by generating a second narrow-band signal, which corresponds to the narrow-band interference signal, and by subtracting the second narrow-band signal from the distorted desired wide-band signal.

6. An apparatus characterized in that the apparatus comprises
    a subtracting unit for subtracting a reference signal from a received input signal;
    a complex phase calculator for calculating the phase of a result of the subtraction signal on a sample-by-sample basis of the in-phase and quadrature components of the signal and performing an arctangent function on the in-phase and quadrature components of the incoming signal,
    a phase unwrap module for removing discontinuities in the phase if the phase passes the in-phase axes in the complex plane with an absolute value greater than Π,
    a comparator module arranged to compare the difference in phase signal values at predetermined time intervals, the difference in said values representing a frequency offset in the subtracting signal, and
    a canceling means for canceling the narrow-band interference signal based on the result of the determined frequency offset,
    wherein the phase unwrap module is configured to accumulate k times 2Π, where k depends on the wrapped function so that k will be increased by 1 if the difference between the last corrected sample and the current sample is smaller than −Π, and k will be decreased by 1 if the difference between the last corrected sample and the current sample is greater than Π.

7. An apparatus according to claim 6, characterized in that the canceling means comprises a filter-bank, wherein the narrow-band interference signal is canceled by selecting a filter from within said filter-bank based on the value of k.

8. An apparatus according to claim 6, characterized in that the canceling means comprises a generating means for generating a second narrow-band signal, which corresponds to the narrow-band interference signal, and a subtracting means for subtracting the second narrow-band signal from the distorted desired wide-band signal.

* * * * *